United States Patent [19]

Bennett et al.

[11] 4,161,630

[45] Jul. 17, 1979

[54] CIRCUIT ARRANGEMENT FOR USE IN TELEPHONE SYSTEMS

[75] Inventors: James P. Bennett, Duffield; David C. Harms, Beeston, both of England

[73] Assignee: Plessey Handel und Investments AG, Zug, Switzerland

[21] Appl. No.: 855,564

[22] Filed: Nov. 29, 1977

[30] Foreign Application Priority Data

Dec. 3, 1976 [GB] United Kingdom ............ 50451/76

[51] Int. Cl.² ........................................... H04M 7/06
[52] U.S. Cl. ............................................. 179/18 EB
[58] Field of Search ........... 179/18 EB, 18 E, 18 DA, 179/18 AH, 84 VF, 15 AT

[56] References Cited

U.S. PATENT DOCUMENTS

| | | | |
|---|---|---|---|
| 3,671,677 | 6/1972 | Lee, Jr. et al. | 179/18 EB |
| 3,941,938 | 3/1976 | Gauthier | 179/18 EB |
| 4,048,450 | 9/1977 | Bernard et al. | 179/18 EB |

Primary Examiner—Thomas A. Robinson
Attorney, Agent, or Firm—Fleit & Jacobson

[57] ABSTRACT

An automatic telephone exchange including registers for the setting up of calls over outgoing junctions by multi-frequency code—(M.F.C.) signalling, in which the junctors are accessible via M.F. control equipments which are connected to the registers via crosspoint switching means.

8 Claims, 5 Drawing Figures

CIRCUIT ARRANGEMENT FOR USE IN TELEPHONE SYSTEMS

The present invention relates to circuit arrangements for use in telephone exchange systems using M.F.C. (multi-frequency code) signalling between registers at different exchanges.

Many forms and variants of M.F.C. inter-register signalling are known and used, and generally, as in the case of C.C.I.T.T. R2 and C.C.I.T.T. No. 5 BIS signalling systems each signal comprises 2-out-of-6 frequencies using a different range of frequencies for the forward and backward direction of signalling.

Registers which are to be involved in the setting-up of calls even over a single outgoing M.F.C. junction route, (using for example either of the two C.C.I.T.T. systems mentioned above) and which are also to be available for use on other types of calls, can become somewhat complicated and costly. This would apply for instance in the case of a register which is otherwise to be employed in conjunction with markers for the setting-up of local (own-exchange calls) and for the routing of calls over outgoing junctions requiring conventional loop-disconnect (L.D.) signalling with the programmed control of in-built L.D. digital sending means for calls which are directed over such junctions. The additional complexity would arise out of the provision in the register of an M.F.C. sender and receiver together with the essential coding and decoding devices constituting the m.f. control equipment. Obviously the complexity would be increased if more than one type of M.F.C. signalling system were to be catered for.

On outgoing junction calls using M.F.C. signalling, the whole inter-change of junction signals for a call is usually accomplished in a short period at the end of the total occupancy-time of the register. For economic reasons, this has led to the concept of providing m.f. control equipments (comprising sender, receiver with forward and backward control means) which are separated from, and fewer in number than, the registers. This calls for the provision of selective switching means between the registers and said equipments together with circuit arrangements for the passage of an extensive range of signals possibly in excess (of twenty) at high-speed in both directions between a register and an m.f. control equipment.

To cater to such a range of signals there is evident need for simple, reliable and economic circuit arrangements, comprising signal transmitting and receiving means at each register and m.f. control equipment, for use in conjunction with a crosspoint switching stage, providing selective connections involving a very limited number of switched conductors for each crosspoint connection, between a register and an m.f. control equipment.

One object of the invention is to meet the before-mentioned needs.

According to the invention there is provided an automatic telephone exchange employing registers for the setting-up of connections over junctors of at least one group of outgoing junctions which employ a particular form of forward and backward M.F.C. signalling, wherein said junctors are accessible from a group of m.f. control equipments each having a sender and receiver compatible with said form of M.F.C. signalling characterised in that a crosspoint switching means is provided for establishing selective two-way signalling connections between said registers and the m.f. control equipments of a least said group, in which circuit arrangements are provided at each register and at each said control equipment and said circuit arrangements comprise signal transmitting and receiving means whereby any 2-out-of-N signal presented locally in parallel-marking form to the transmitting means of the register or the m.f. control equipment effects generation of a corresponding signal in serial form which is transmitted as an N-bit sequence over a single bi-directional wire of the particular selective connection and is operative in the receiving means of the m.f. control equipment or register respectively to effect reproduction of the signal in parallel-marking form.

According to another feature of the invention the exchange is provided with junctors of at least one other group of outgoing junctions using a different form of M.F.C. signalling these junctors being accessible from a second group of m.f. control equipments each compatible with said different form of M.F.C. signalling and in which said crosspoint switching means is also used for the establishment of signalling connections between the before-mentioned registers and the second group of m.f. control equipment said equipments each including circuit arrangements corresponding to those of the first-mentioned m.f. control equipments and operable in identical manner.

The invention will be better understood from the following description of one method of carrying it into effect which should be read in conjunction with the accompanying drawings comprising FIGS. 1 to 5. Of these drawings;

FIGS. 3 and 4 joined together in that order depict in abbreviated manner, circuit arrangements of the m.f. signalling interface equipment, of a said register, and an m.f. control equipment; the two equipments being connected together over a 4-wire path provided by the data switch; whereas

Figures 1, 2:
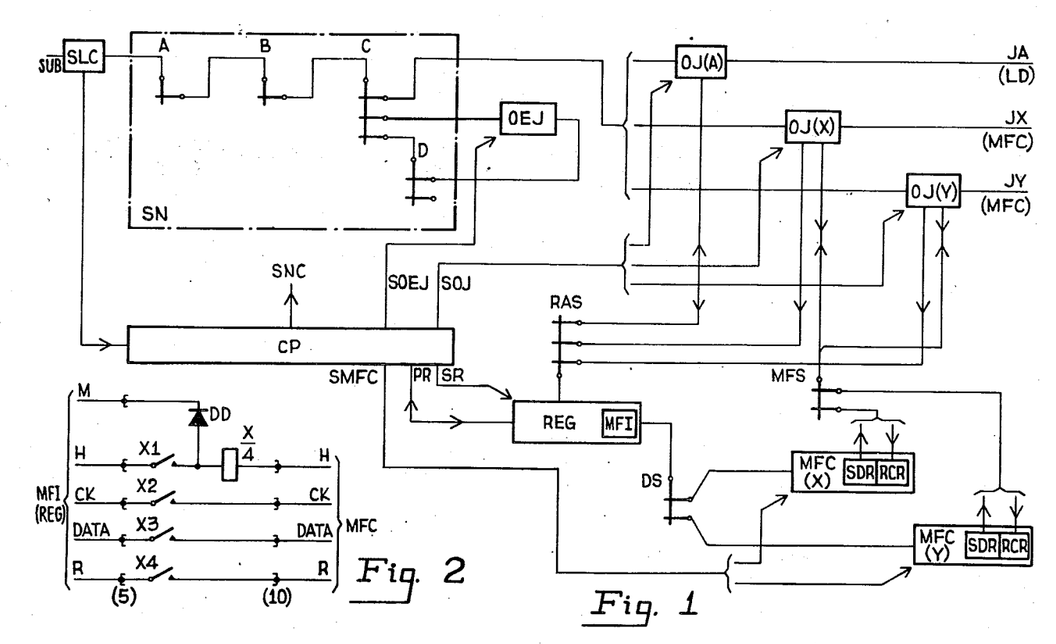
FIG. 1 shows trunking arrangements of a portion of a telephone exchange incorporating the invention.
FIG. 2 represents a reed-relay switching matrix constituting a so-called data switch of the typical exchange to provide selective connections between registers and m.f. control equipments.

Considering FIG. 1 this typifies one variant of the range of exchanges manufactured by the Applicants under the trade name "PENTEX" and the portion shown is concerned with (a) own-exchange calls, which are those between subscribers, such as SUB, directly served by the particular exchange, and (b) calls outgoing to or through other exchanges by way of junctions. Typically, these outgoing junction routes are represented viz:-route JA which comprises a plurality of junctions, say to an exchange A, arranged for loop-disconnect signalling/digital impulsing; route JX which comprises junctions to exchange X and which utilise one form of M.F.C. inter-register signalling (e.g. in accordance with the C.C.I.T.T. R2 signalling system); and the junction route JY which involves another form of M.F.C. signalling (say C.C.I.T.T. No. 5 BIS). It is well-known that although both of the typical M.F.C. systems employ backward and forward signals in 2-out-of-6 form the frequencies are different in each case, just as the significance of the signals is different in many instances.

The junctions of routes JA, JX and JY are individually served by groups outgoing junctors such as OJ(A), OJ(X) and OJ(Y) respectively, and these like the group of so-called "own-exchange" junctors, such as OEJ, are accessible over outlets of C-switches of the main switching network SN of the exchange. This network comprises A, B, C and D stages of matrix switches, in which each matrix switch comprises a well-known coordinate arrangement of marking-controlled crosspoint relays of the reed-contact type. The second (or called) side of each own-exchange junctor OEJ terminates on an outlet of the D-stage of the main switching network to enable a local caller connected over stages A, B and C to a junctor OEJ to be connected to another subscriber of the exchange via stage D and thence by way of stage C, B and A to the called party.

The overall management and control of the exchange is effected by a call processor CP which is able to acquire status and other essential information in respect of all the before-mentioned junctors, the subscribers' line circuits (SLC), registers such as REG and the m.f. control equipments MFC(X) and MFC(Y). Additionally the call processor is enabled to acquire information from salient points of the switching network SN in respect of available paths through it, and moreover incorporates marking means (operable over multi-conductor path SNC) for enabling connections to be set-up as required over that network. The call processor has facilities, using a path such as SR, for selecting individual registers, e.g. REG, for use, and for the rapid interchanging of information with such a register over a path PR. Again the call processor, according to the requirements of particular calls is enabled to control the setting-up of a connection over the register access switch RAS (comprising up to three-stages of reed matrix switches) between any junctor of any outgoing route and any register. Moreover it is convenient to assume that the call processor is responsible for the selection and setting-up of connections over the so-called m.f. switch MFS which is again of the reed-relay matrix form. In practice selection and setting-up functions are performed by a small processor unit (referred to as the M.F. control processor unit) and not directly by the call processor CP.

It is to be noted that switch MFS provides full-availability access between individual junctors OJ(X) of the MFC R2 System route JX and individual ones of the group of m.f. control equipments typified by MFC(X). The latter equipments are each specifically concerned with the forward and backward signalling over the outgoing R2-type junctions. Similarly switch MFS give full-availability access between junctors OJ(Y), of the outgoing No. 5 BIS route JY, and the m.f. control equipments such as MFC(Y). Each of the two categories of m.f. control equipments MFC(X) and MFC(Y) includes an appropriate kind of sender SDR and receiver RCR, and in each case the sender is to be selectively operable (by any of a multiplicity of signals forthcoming, via switch DS, from the interface equipment MFI of any register), to transmit a suitable 2-out-of-6 M.F.C. signal forwardly. Also, in each case, the receiver is arranged to respond to any valid backward M.F.C. junction signal and to deliver a corresponding signal over switch DS to the interface equipment of the register.

Switch DS, conveniently termed the data switch provides full-availability access between all register REG and the lesser number m.f. control equipments of all categories. The data switch is of particular relevance to the present invention, and preferably comprises a single switch-stage formed from a plurality of reed-relay matrix switches such as that shown in FIG. 2; the crosspoints of the matrix switch being multipled in known manner to provide ten inlets and five outlets appropriate to registers and MF control equipments respectively. The number of such (10×5) switches, which constitute the digit switch, is determined according to register and m.f. control equipment quantities to meet traffic requirements, and the composite switch is formed in known manner by external row and column multipling of the constituent matrix switches.

In considering the 10×5 matrix switch of FIG. 2 with its 50 crosspoint relays, the typical crosspoint relay X has four "make" contacts X1, X2, X3 and X4 for providing a 4-wire connection between the m.f. interface equipment MFI of a unique register and a unique m.f. control equipment MFC. The connection is initially set-up by operation of relay X over diode DD from markings forthcoming (under call processor control) at lead M of the register and lead H of equipment MFC, the relay being duly held over contacts X1 by potentials at leads H of the register and the m.f. control equipments. The data switch has three signalling wires CK, DATA and R (associated with contacts X2, X3 and X4) for each connection. Wire CK serves to transmit clock pulses from the register to the particular m.f. control equipment occupied by the register. The data-wire DATA is to be employed for the sequential interchange of signals each formed in a 2-out-of-8 pulse series, which allows for the passage of a variety of signals in each direction. Of these signals many will relate to M.F.C. signals to be generated by or received by an m.f. control equipment, but others may be reserved for supervision and control purposes. Wire R is to be used for the application of so-called request signals to the interface of the register by the m.f. control equipment.

Reverting to FIG. 1, all calls originated by a local subscriber initially result in the setting-up of a connection by way of the subscriber's line circuit and stages A, B and C of switching network SN to an idle outgoing junctor of what has come to be known as the primary route; regardless of whether the call requires that route finally. This primary route is usually the outgoing route to that remote (e.g. main) exchange, having the greatest community of interest with the originating exchange, and it may be assumed to be the loop-disconnect signalling route JA employing junctors such as OJ(A). The call processor CP responds to a call origination by identifying the caller and by taking an idle register, such as REG, into use. The caller's identity is stored in the register and the call processing equipment nominates an idle junctor of the primary route for use. The call processor thereupon causes the identified line circuit to be connected to the nominated junctor by selecting and establishing a suitable path over switching network SN. Also the processor controls the setting-up of a signalling path between the seized junctor and the nominated register over the register access switch RAS.

At this time, dialling tone is returned to the caller and the caller then proceeds to dial the wanted number, which is received by the register, digit by digit, via the switching network, junctor and switch RAS. The digits, assumed to be transmitted in loop disconnect form, are stored in the register, and the first and/or possible accumulations of digits (up to say the fourth) are duly referred to the processor until a route discrimination is produced, i.e. own-exchange or particular outgoing routing.

In the case of an own-exchange discrimination, the connection between the subscriber and the outgoing primary route junctor OJ(A) is released during the current interdigital pause period. During the same period, the own-exchange discrimination results in the call processor causing an idle one of the own-exchange junctors such as OEJ to be nominated for use, and promptly connects that newly seized junctor to the calling line over A, B and C switches of network SN, whilst also causing switch RAS to connect that junctor to the original register. Thereafter the register, typically having a capacity for twenty digits, continues to accumulate digits of the dialled number, and, when this has been completed, a test is made by the processor to determine whether the called line is idle. If this is so, the call processor, taking into account the dialled number (communicated by the register) and the identity of the own-exchange junctor, completes the call in known manner between the junctor and the called line; using D, C, B and A switches of network SN. The register is released and the junctor ultimately provides the speaking-battery bridge for the connection, in addition to being concerned with supervision or eventual release of the connection.

In the case of the call processor effecting an outgoing-route discrimination appropriate to the primary route JA, the network SN connection to the currently employed junctor OJ(A) of that route is not released, and dialled digits forthcoming from the caller may continue to be extended over it to the register. Meantime said route discrimination causes a distinctive call-controlling and routing programme to be produced by the processor which promptly transfers it to the register. In the case of the present call which is to utilize loop-disconnect signalling over the primary route, the programme constitutes an instructional procedure to be adopted by the register in respect of such functions as to which, if not all, of the stored digits are to be re-transmitted, and the durations of inter-digital pauses to be used.

However digital information in loop-disconnect form is duly transmitted, over switch RAS to the route JA junction, by impulsing means included in the register, and so the call is routed to the called party using the exchange at the remote end of the junction as a terminal or tandem exchange as the case maybe. Upon completion of routing of the call, the register is released leaving the junctor, which includes a speaking bride, to supervise the call.

The outgoing route discrimination, when produced, may thereupon alternatively determine that ensuing digits are to be sent forward without the assistance of a register. In this case, the register and the access switch are promptly released, and the outgoing junctor merely repeats to the junction JA the digits which are received direct from the subscriber.

As already mentioned, the typical exchange caters to calls over routes JX and JY involving M.F.C. signalling in accordance with Systems C.C.I.T.T. R2 and No. 5 BIS respectively although additional routes of either type may well be catered to. Indeed routes using other forms of "compelled" forward and backward M.F.C. signalling, either additionally or alternatively, could readily be catered to. However in the typical exchange, the call processor may, when one or more digits have been referred to it, institute a route discrimination appropriate to either of the M.F.C. signalling routes JX and JY. Thereupon the processor promptly communicates, to the register, a call-controlling and routing programme, which is appropriate to the signalling format of the particular route. Additionally, during the relevant inter-digital pause, the processor chooses an idle junctor appropriate to the specified M.F.C. route, and establishes a new path over network SN from the calling line to that junctor, whilst also connecting the register to the last-mentioned junctor, OJ(X) or OJ(Y) over switch RAS. The network SN and switch RAS connections involving the relevant primary-route junctor are released at this stage together with the primary-route junctor.

Assuming that the call is to be extended over a junction of the outgoing route JX (typically C.C.I.T.T. R2), the processor CP is employed for a short period to select an idle junctor OJ(X) of that route. When (in accordance with a programme produced by the call discrimination) sufficient digits have been received to indicate that m.f. sending may commence, an idle one of the m.f. control equipments such as MFC(X) is selected. Thereupon a connection is established over switch MFS between the two devices. This connection caters to forward M.F.C. signals from the sender SDR incorporated in the MFC(X) control equipment, and for backward junction signalling to the receiver RCR also incorporated. At this time also, the processor establishes a bi-direction transmission path, by way of the data switch DS, between the m.f. interface (MFI) of the register and the particular m.f. control equipment MFC(X).

It can be deduced that if the processor had devloped an outgoing route discrimination in favour of route JY (typically C.C.I.T.T. No. 5 BIS), transfer of the caller to a junctor such as OJ(Y) would have been accomplished in a similar manner to the foregoing. In these circumstances, that junctor is connected to the original register over switch RAS, and additional connections involving switches MFS and DS are set-up to associate a nominated m.f. control equipment such as MFC(Y) with the newly-employed junctor and the particular register.

CIRCUIT ARRANGEMENTS

Figure 3:
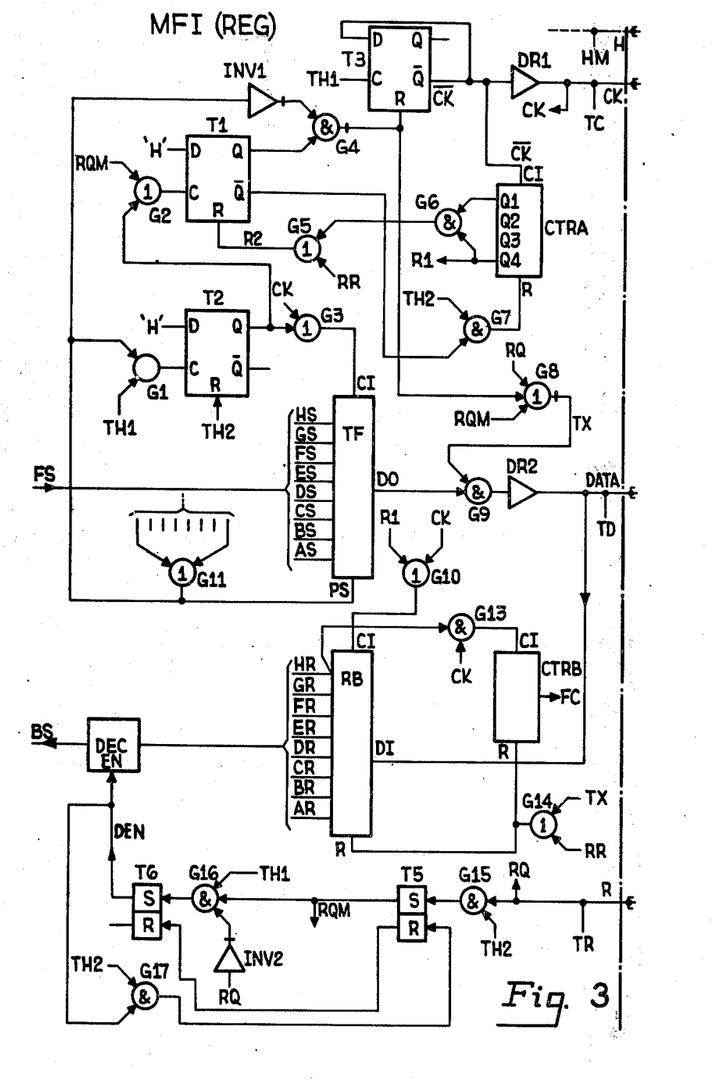
Figure 4:
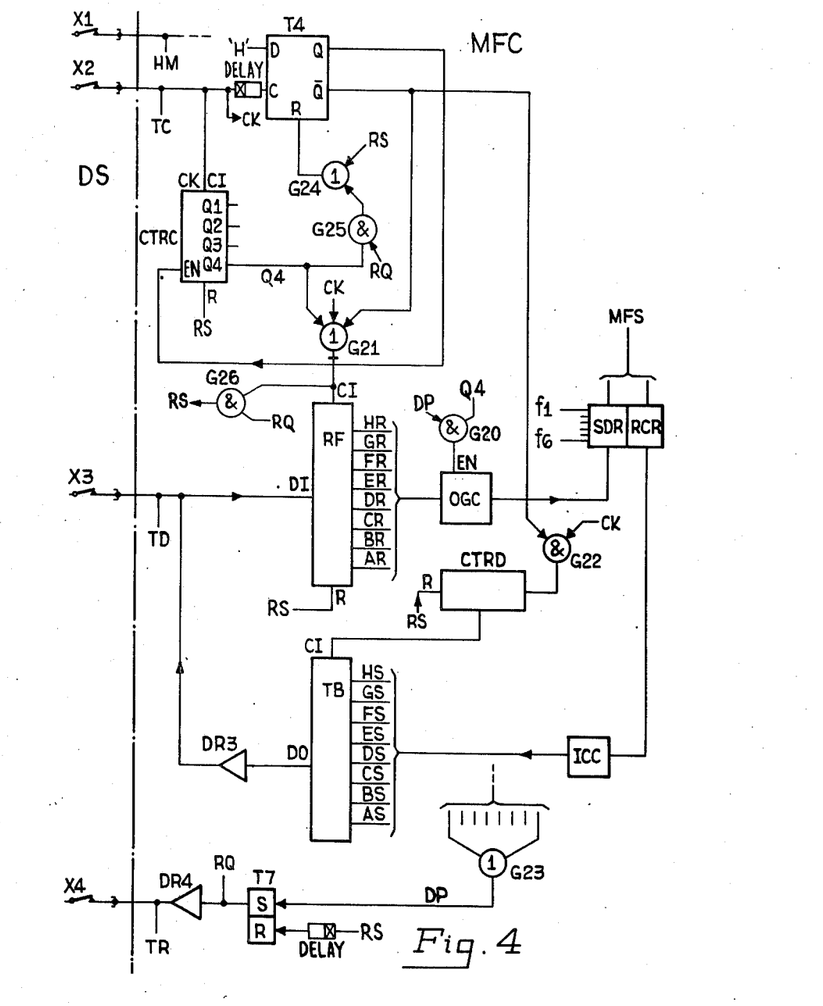
Figure 5:
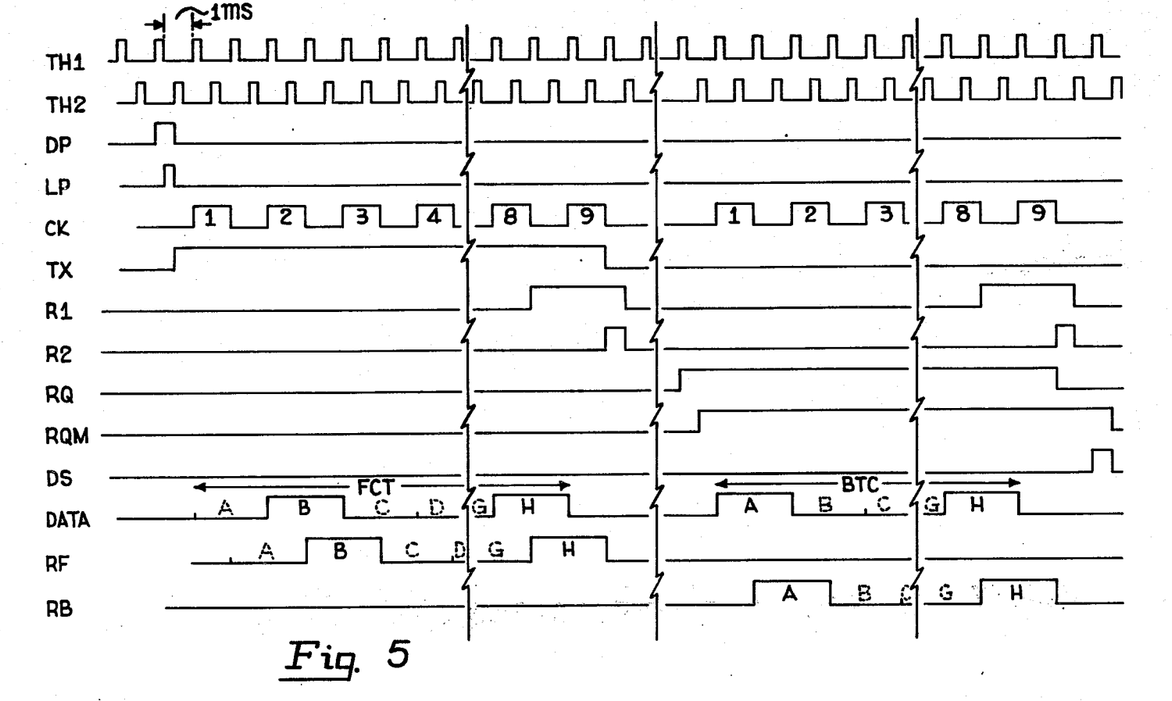
FIG. 5 is a pulse diagram representing electrical conditions encountered, under operating conditions, at salient points of said circuit arrangements.

The abbreviated circuit arrangements of FIGS. 3 and 4, to be described in conjunction with the pulse diagram FIG. 5, relate to data interchange between a typical register REG and a typical m.f. control equipment MFC. The latter may be considered to be an equipment MFC(X) of FIG. 1 in that it is concerned with the System R2 form of signalling over any appropriate outgoing junction.

The m.f. interface MFI of the register at the left is represented as being already connected, to the m.f. control equipment MFC over the path, comprising the H, CK, DATA and R wires, by the operated crosspoint relay X of the data switch DS. The forward signalling path FS of the register is connected to the eight input leads of a transmit-forward device TF which, comprises a shift register, is arranged to transpose any data item or digit, applied in 2-out-of-8 parallel marking form, to a signal in serial pulse-form at its output DO; the signal being constituted by a pulse in each of two significant periods of an 8-part pulse sequence. The receive-forward device RF (in the m.f. control equipment MFC) also incorporates a shift register and is responsive to each 2-pulse signal, forthcoming from device TF by way of the DATA wire, to reproduce the requisite 2-out-of-8 parallel signal at its output comprising conductors AR to HS. Each such data signal reproduced at the output of device RF is translated to a suitable form by the outgoing converter device OGC for appropriate control of the m.f. sender SDR associated with the m.f. control equipment MFC.

The sender SDR which is controlled from the parallel signalling-path of the receive-forward device RF, and upon receiving a valid data signal is operative to transmit an appropriate pair of the six available v.f. signalling frequencies, f1 to f6, over path MFS and thence to the outgoing junction.

The backward direction of transmission, involving 2-out-of-6 MFC signals received, over path MFS from an outgoing junction, by the m.f. receiver RCR makes use of the transmit-backward device TB and the receive-backward device RB of equipments MFC and MFI respectively. In this case acknowledgement/instruction signals of a predetermining form produced by the receiver from m.f. junction signals are converted, by incoming converting device ICC, to 2-out-of-8 form at the eight input leads AS to HS of device TB. This device is used to translate the input-data to serial pulse form for transmission over the DATA wire to the input lead DI of the receive-backward device RB. This device includes a shift register, and serves to re-convert each item of data to parallel 2-out-of-8 form at the path comprising conductors AR to HR; and a decoder DEC, and associated scanner SCAN, is provided to enable say a particular conductor of the multi-conductor path BS to be energised for signal interpretation by the register.

The circuit arrangements include D-type toggles T1 to T4, S-R toggles T5 to T7, transistor drivers DR1 to DR4, together with inverters INV1 to INV3. The circuit arrangements also incorporate AND and OR gates represented by circular symbols with arrow-head inputs; the enclosed "&" or "1" symbol signifying the "AND" and "OR" functions respectively.

When the m.f. control processor unit initially sets-up the connection between equipments MFI and MFC by operation of the crosspoint relay, the continuity of the CK, DATA and R paths, by way of the relay contacts X2, X3 and X4 of the data switch, is checked by test means (not shown) connected over lead TC, TD and TR in each of the two equipments. The test process involves application of a short-duration pulse to each of the leads in the m.f. control equipment MFC and the response of relevant pulse monitors at the interface equipment. Failure to detect a pulse would indicate a continuity fault which would be reported by means not shown. It is convenient to mention that the hold-wire H of a data-switch connection is continuously monitored over the HM lead of each of the MFI and MFC equipments by circuit means (not shown) arranged to produce a fault indication if the connection is prematurely released.

Within the register two sources of regularly-recurrent pulses TH1 and TH2 are provided. The pulses of the two sources, as represented in FIG. 5, are symmetrically interlaced, and have a repetition rate of 1mS (millisec) with an on/off ratio of 1:3.

FORWARD TRANSMISSION

The data switch connection is established when, as dictated by the register programme, the 20-digit store of the register has received sufficient digits to start sending. Thereupon the first data item or digit to be sent is advanced to the forward signalling path FS as a 2-out-of-8 parallel-marking condition for a period DP (FIG. 5) comprising 0.5 mS interval between the starts of successive TH1 and TH2 pulses. The parallel marking is presented to device TH over leads AS to HS and is also detected by the OR gate G11. This gate extends a "1" signal to lead PS of device TF so that the data input is registered in that device preparatory to re-transmission in the serial mode over output lead DO. The output signal "1" of gate G11 is also applied to AND gate G1, and to the inverter INV1 which applies "0" to an input lead of gate G4 to ensure the reset state of toggle T3. The D-type toggles T1 and T2 have their D inputs permanently in the 'high' state as signified by "H". Toggle T2 is actuated at its clock input C by gate G2 upon the back edge of the next occurring TH1 pulse, i.e. 0.25 mS after the parallel data is applied to device TF. Accordingly the Q output lead and therefore the output of OR gate G3 goes to "1" at this time. The "1" output of gate G3 is extended to the clock input lead CI of the transmit-forward device TF to constitute a load pulse LP (FIG. 5) which thereupon causes the parallel 2-out-of-8 input data to be loaded into the relevant eight successive stages of its shift register.

Meantime the Q output "1" of toggle T2 also activates toggle T1 by way of gate G2, so that the Q annd Q̄ output leads thereof assume "1" and "0" conditions respectively. The Q output of toggle T1 is ineffectual at this juncture, but the Q̄ output "0" causes the OR gate G8 to produce a "1" output pulse TX (FIG. 5) which will persist until completion of the whole forward data-transmission sequence. Indeed the sustained pulse TX from gate G8 a) conditions the AND gate G9 for the passage of serial data-pulses duly occurring at the output D0 of the device TF, and b) is operative over gate G14 to ensure that the "reset" state of counter CTRB and of receive-forward device RB is maintained throughout the forward data transmission sequence. Therefore device RB cannot respond to forward signals on the DATA wire.

Toggle T2 is permanently reset (after 0.25 mS) by the next occurring TH2 pulse and so the load pulse LP is terminated, and further clocking of device TF is vested in the pulses forthcoming to gate G3 from a source CK. The parallel data at path FS is removed by the register at the time of occurrence of said TH2 pulse, and so gate G11 causes inverter INV1 to produce a "1". Thereupon the inverting AND gate G4 terminates the lead R "reset" condition "1" of toggle T3. In addition to serving the driver DR1, the Q̄ output lead of the toggle T3 is fed to the D lead of the toggle so that the toggle will perform as a so-called pulse-halver under control of leading edges of successive pairs of TH1 pulses. Therefore T3 and the drive DR1 proceed with the generation of a series of nine clock pulses CK (FIG. 5) of 1 mS duration with 1 mS spaces.

The clock pulses CK delivered by driver DR1, besides serving several parts of equipment MFI, are delivered over wire CK of the data switch of the m.f. control equipment MFC. Within the register interface equipment, the CK pulses are effectively applied to counter CTRA, and, by way of gate G3, to the clock input CI of the transmit-forward device TF. The counter CTRA is concerned with generating a count-of-8 pulse at lead R1, in respect of clock pulses, and with the generation of a count-of-9 pulse at lead R2 by way of AND gate G6 and OR gate G5; the two pulses being available for resetting purposes.

As a result of the leading edge of successive clock pulses CK being applied at 2 mS intervals to the clock input lead CI of the transmit forward device TF, the shift register of the latter is advanced so that eight serial output conditions are produced at its lead DO. Gate G9, primed for the period of pulse TX, passes "1" conditions occurring at said output lead to the driver DR which advances the conditions over the DATA wire to the data input lead DI of the receive forward device RF in equipment MFC.

Referring to FIG. 4; it can be seen that the CK clock pulses define eight successive 2 mS parts, A, B . . . H, of a transmission cycle FCT performed over the DATA wire. A valid item of data comprises a pulse ("high" condition) in two significant parts of the cycle. In the example, the significant pulses are evident in the second (B) and eighth (H) parts of the sequence. Transmission is terminated when device TF is empty.

Meantime the CK clock pulses (trailing edges) are counted by the "binary-coded decimal" counter CTRA which (a) on the count of 8 produces an R1, and (b) on the count of 9 is operative over gates G6 and G5 to produce an R2 pulse. In the present instance, the R2 pulse is applied to reset lead R of toggle T1. Thereupon toggle T1 is operative over gate G4 to ensure that toggle T3 now remains reset, so that the generation of clock pulses CK ceases. The resetting of toggle T1 causes gate G8 to terminate the TX pulse which disables gate G9 in the forward DATA path, and, by removing the reset condition from counter CTRB and device RB prepares for the backward data-receiving function of equipment MFI. Toggle T1, when reset, enables counter CTRA to be reset over gate G7 by the next TH2 pulse. Thereupon the R1 and R2 pulses are terminated, and the equipment MFI awaits initiation of backward transmission of data by equipment MFC.

The effect of the above described forward data-transmission process upon the m.f. control equipment will now be described. The first of nine clock pulses forthcoming over the CK wire to equipment MFC is operative at the clock input lead C of toggle T4 to set that toggle which at its Q output ensures that counter CTRC is reset. The toggle, which has its D input in the high state H, remains set and at output lead $\bar{Q}$ allows gate G21, fed by clock pulses derived from the wire CK, to produce inverted clock pulses which are applied to the clock input of the receive-backward device RF. Accordingly device RF is effectively clocked at an instance corresponding to the trailing edge of each of the first eight of the original (non-inverted) clock pulses CK i.e. at the mid-points of parts A, B . . . H of the incoming data-pulse sequences; the entry of the typical 2-pulse code "BH" into the shift register of device RF being represented at RF in FIG. 5.

Meantime clock pulses CK incoming to equipment MFC are also applied to inverter INV3 for connection in inverted form to the "binary-coded decimal" counter CTRC. When this counter has attained a "count-of-8" state its Q4 output disables gate G21 to terminate the clocking of device RF. As a result of the typical data signal received by device RF, the output leads BR and HR are exclusively marked. These markings are effective upon the outgoing converting device OGC, which comprises a programmed read-only memory (PROM), to extend a distinctive signal to the sender SDR. Therefore the sender extends the appropriate m.f. signal, comprising two of six frequencies f1 to f6, over switch MFS to the outgoing junction.

However, as a result of the ninth clock pulse CK having been received by equipment MFC the counter CTRC is operative over gate G20 to generate a reset pulse R3 which is effective to reset toggle T4 and device RF by way of gates G24 and G25 respectively.

The circuit arrangements now await the response of the m.f. receiver to an acknowledgement/instruction signal forthcoming from the employed junction.

BACKWARD TRANSMISSION

When an m.f. signal as a result of the foregoing forward signalling procedure, is duly received by receiver RCR to signify an instruction such as "send next digit", it is repeated as a marking signal (2-out-of-6) to the incoming converting equipment ICC which involves a programmed read-only memory. This effects the marking of an appropriate pair of the eight input leads AS to HS of the transmit-backward device TB.

The presence of the data markings is also recognized by gate G23 which thereupon applies a setting pulse to toggle T7. The set-side (S) of the toggle produces a "1" output signal RQ (FIG. 5) for use locally, and for extension by the driver DR4 to the R wire of the data switch and thence to the register interface equipment MFI.

Within the m.f. control equipment MFC, the sustained RQ pulse is effective over gates G24 and G25 respectively ensure the reset states of toggle T4 and the receive forward device RF. Accordingly the latter is prevented from responding to any data signals to be transmitted backwardly. The derived RQ pulse at the register interface equipment MFI, together with the subsequently generated pulse RQM, ensures that gate G8 and therefore gate G9, at the output of device TF, remain disabled. The first TH2 pulse occurring after the start of the RQ pulse is effective over AND gate G15 to set the toggle T5 which produces the aforesaid RQM pulse. The latter, by way of gate G2, activates toggle T1 so that gate G4 will enable toggle T3 to commence its pulse-halving function, as already described, with respect to ensuing TH1 pulses. The occurrences of odd numbered TH1 pulses define the start of 1 mS clock pulses CK (equal mark and space) now to be transmitted over the CK wire to equipment MFC.

Toggle T4 of equipment MFC does not respond to incoming clock pulses CK so that its $\bar{Q}$ output effectively disables the receive forward device RF, whilst enabling gate G22 to pass the clock pulses to the counter CTRD. The latter as a result of the first eight CK pulses enables the transmit backwards device TB to perform a selection or distribution function with respect to the 2-out-of-8 marking condition hitherto received at its leads AS to HS and now stored in the device. This selection function determines that a serial 8-part backward transmission sequence (BCT of FIG. 5), corresponding to the input data, is produced at the output lead DO of device TB. The serial pulse-sequence is advanced by driver DR3 to the DATA wire, the start of each part of the sequence coinciding with the leading edge of a CK pulse.

Within the register interface equipment MFI, the CK pulses serve to clock the counter CTRA in preparation for the generation of R1 and R2 pulses for resetting functions. The CK pulses are extended to lead CI of device RB to enable ensuing backward DATA wire conditions (constituted by the 8-part sequence BCT of FIG. 5) to be entered into that device on the trailing edges of the first eight pulses as indicated by RB in FIG. 5. Also the clock pulses CK, in conjunction with gate G13, enable the data markings (A and H of the particular sequence BCT) to be counted for validity checking purposes by counter CTRB. These markings are detected at lead HR as they are entered into the input stage of the shift register of device TF. Counter CTRB is so organised that on conclusion of a backward transmission sequence it will extend a pulse over lead FC to fault recording means if none or more than two marking pulses (2-out-of-8) is entered into device RB.

As a result completion of the receive-backward transmission sequence, the output leads AR to HR should be conditioned to constitute a 2-out-of-8 parallel code; typically leads AR and HR being marked by the stored data. The requirement now is to convert it to a signal suitable for utilisation within the register. The decoder DEC and scanner SCAN represented in the interface equipment are provided for this purpose.

Meantime CK pulses are operative on counter CTRA of equipment MFI, and on the count-of-8 a second R1 pulse is initiated to disable further clocking of device RB.

In equipment MFC, when counter CTRC has registered a count-of-9 pulses CK, it generates an R3 pulse, over gate G20. This pulse resets the counter CTRD and also toggle T7 which removes the RQ pulse ("1") in the equipments MFC and MFI.

Meantime, within the register interface equipment MFI, upon completion of the backward transmission sequence BCT (FIG. 5) the point has been reached where the parallel data (2-out-of-8) evident at leads AR to HR of device awaits decoding. Moreover the state of counter CTRA is such that an R1 pulse has matured, and on the count of 9 an R2 is produced. The R2 pulse resets toggle T1 which on the occurrence of a TH2 resets counter CTRA to terminate the R1 and R2 pulse conditions. The cessation of the R1 pulse causes inverter INV2 to produce a "1" output which is applied to AND gate G16. With the RQM pulse evident at a second input lead, gate G16 is actuated on the occurrence of the next TH1 pulse. Accordingly the toggle T6 is set to activate the scanner SCAN which performs high-speed scanning cycle of up to twenty-eight 3-input AND gates included in the decoder DEC; two input leads of each gate monitoring a unique pair of leads AR to HR while the third lead is for the scanner input. A 2-out-of-8 marking situation at the output of device RB (leads AS and HS in the present example) causes activation of the relevant decoder gate which identifies the incoming signal to the register by energising say an appropriate conductors in the multi-conductor path BS. The decoder then passes a short duration signal to gate G17 and whilst this signal is present a TH2 pulse momentarily activates the gate to effect resetting of toggles T6 and T5. Therefore the scanner is disabled, and the RQM pulse is terminated.

In due course the register presents a second data item or digit to path FS and the forward transmission process is initiated and performed as before. This is again followed by another backward transmission in accordance with a requisite acknowledgement/instruction requirement presented by the receiver. The interchange of signals in this manner continues until the total routing requirements of the call have been met. Thereupon no further presentation of data to path FS takes place and the register is released. Thereupon a "1" condition is applied to leads RR in equipment MFI to confirm the resetting of toggle T1, device RB and counter CTRB.

Moveover the register access switch RAS, the digit switch DS and switch MFS are released together with the control equipment MFC; and the particular junctor is conditioned for speaking and supervisory purposes.

What is claimed is:

1. An automatic telephone exchange employing registers for the setting-up of connections over junctors of at least one group of outgoing junctions which employ forward and backward multi-frequency code signalling, wherein said junctors are accessible from a group of multi-frequency control equipments each having a sender and receiver compatible with said multi-frequency code signalling characterised in that a crosspoint switching means is provided for establishing selective two-way signalling connections between said registers and the multi-frequency control equipments of at least said group, in which circuit arrangements are provided at each register and at each said control equipment and said circuit arrangements comprise signal transmitting and receiving means whereby any 2-out-of-N signal presented locally in parallel-marking form to the transmitting means of the register or the multi-frequency control equipment effects generation of a corresponding signal in serial form which is transmitted as an N-bit sequence over a single bi-directional wire of the particular selective connection and is operative in the receiving means of the multi-frequency control equipment or register respectively to effect reproduction of the signal in parallel-marking form.

2. An automatic telephone exchange as claimed in claim 1, the exchange being provided with junctors of at least one other group of outgoing junctions in which said junctors are accessible from a second group of multi-frequency control equipments and in which said crosspoint switching means is also used for the establishment of signalling connections between the beforementioned registers and the second group of multi-frequency control equipments, said equipments each including circuit arrangements corresponding to those of the first-mentioned multi-frequency control equipments and operable in identical manner.

3. An automatic telephone exchange as claimed in claim 1 in which said crosspoint switching means is a four wire switching path.

4. An automatic telephone exchange as claimed in claim 3 in which a first one of said four wires is provided for transmission of a control or holding function for said crosspoint switching means; in which a second one of said four wires is provided for tranmission of clock pulses from a register to a selected multi-frequency control equipment; in which a third one of said four wires is provided for transmission of data between a register and a selected multi-frequency control equipment and in which the fourth one of said wires is provided for transmission of at least a clock pulse request signal from said multi-frequency control equipment to said register.

5. An automatic telephone exchange as claimed in claim 4 in which said register automatically transmits both clock pulse and data information to said multi-frequency control equipment.

6. An automatic telephone exchange as claimed in claim 5 in which the register includes means to transmit eight data bits to the multi-frequency control equipment and means for transmitting subsequently a ninth bit which changes the register to a reception mode and the multi-frequency control equipment to a transmission mode.

7. An automatic telephone exchange as claimed in claim 6 in which the multi-frequency control equipment includes means for transmitting a request signal, on said fourth wire, to said register and in which said register includes means for reception of said request signal and means for transmitting clock pulse signals on said second wire to said selected multi-frequency control equipment in response to receipt of said request signal.

8. An automatic telephone exchange as claimed in claim 7 in which said multi-frequency control equipment includes means responsive to receipt of said clock pulses to transmit data to said register.

* * * * *